(12) United States Patent
Eberlein et al.

(10) Patent No.: US 10,013,337 B2
(45) Date of Patent: Jul. 3, 2018

(54) FEATURE SWITCHES FOR PRIVATE CLOUD AND ON-PREMISE APPLICATION COMPONENTS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 237 days.

(21) Appl. No.: 14/968,839

(22) Filed: Dec. 14, 2015

(65) Prior Publication Data

US 2017/0168919 A1 Jun. 15, 2017

(51) Int. Cl.
*G06F 11/36* (2006.01)
*G06F 3/0482* (2013.01)
*G06F 3/0484* (2013.01)

(52) U.S. Cl.
CPC ........ *G06F 11/3664* (2013.01); *G06F 3/0482* (2013.01); *G06F 3/0484* (2013.01)

(58) Field of Classification Search
CPC ... G06F 11/3664; G06F 3/0482; G06F 3/0484
See application file for complete search history.

(56) References Cited

U.S. PATENT DOCUMENTS

| | | | |
|---|---|---|---|
| 6,338,088 B1* | 1/2002 | Waters | H04Q 3/0054 709/223 |
| 7,739,680 B1* | 6/2010 | Thakur | G06F 8/67 709/248 |
| 7,890,925 B1* | 2/2011 | Wyatt | G06F 9/4411 717/106 |
| 2006/0075305 A1* | 4/2006 | Robinson | G06F 11/3684 714/38.1 |
| 2015/0097663 A1* | 4/2015 | Sloo | G01N 27/02 340/501 |
| 2016/0210181 A1* | 7/2016 | Kikuchi | G06F 11/0751 |

\* cited by examiner

*Primary Examiner* — Viva L Miller
(74) *Attorney, Agent, or Firm* — Buckley, Maschoff & Talwalkar LLC

(57) ABSTRACT

A set of features is received. A feature from the set of features includes a feature setting. The feature setting is adjusted based on a user input. A source code portion that corresponds to the adjusted feature setting is transported to a test system. The source code portion is implemented at the test system and evaluated based on the adjusted feature setting. Log data from the test system is analyzed in a feature evaluation UI. The evaluated feature with the implemented source code portion is submitted for deployment from the test system to a production system.

14 Claims, 6 Drawing Sheets

FEATURE SWITCHES FOR PRIVATE CLOUD AND ON-PREMISE APPLICATION COMPONENTS

FIELD

Embodiments described herein generally relate to tools and techniques including processes and apparatus for development, maintenance, and installation of software programs. Further, tools and techniques for updating, installing, and version management of an existing operating system, application program, or other executable program, in order to produce an upgraded or updated program are described.

BACKGROUND

In feature management of cloud software, feature switches typically de-couple feature deployment from feature activation. Further, feature switches allow switching off a new feature upon testing and defining groups of users to receive the new feature. Thus, feature management of cloud software provides evaluation of user acceptance and performance of the new feature, and allows switching off a feature without the requirement to redeploy an application to remove the new feature.

In contrast, feature management for on-premise software typically allows switching the new feature on and not switching the feature back off, especially if the switching is established by changing configuration. Feature switches are customizable per tenant or system, instead of per user. Testing different combinations of switches requires different tenants or systems. Upon testing of a certain features' combination, one must set up new tenants or systems in order to be able to test different combinations of switches. Further, the new feature might not work properly at customer side due to customer modifications. Thus, evaluation of the new feature is a complex and cumbersome process.

SUMMARY

Various embodiments of systems and methods for feature switches for private cloud and on-premise application components are described herein.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for feature switches for private cloud and on-premise application components are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
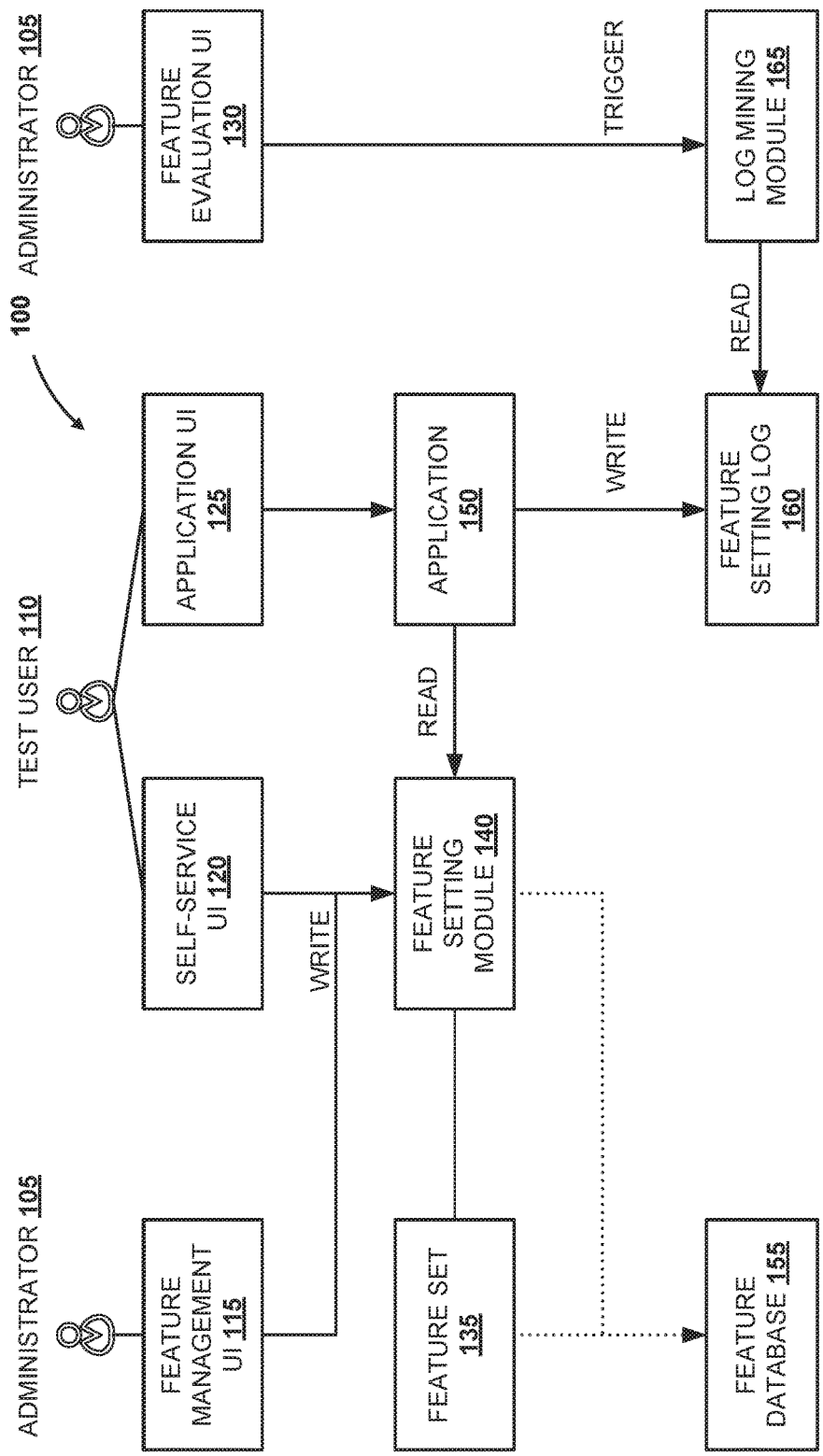
FIG. 1 is a block diagram illustrating a feature management infrastructure, according to one embodiment.

FIG. 1 illustrates an infrastructure 100 that manages features of an on-premise/private cloud application 150, according to one embodiment. Features are managed via a user interface (UI), such as feature management UI 115. Feature management UI 115 provides administrator 105 with access to a number of features. For example, the number of features may include, but is not limited to, personalized user access to resources, management and access to unstructured information (e.g., text files, slide shows, audio files), adding or removing UI controls, including UI controls that provide shortcuts to additional functions, etc. In one embodiment, a vendor delivers and supports application 150. As part of the support process, the vendor delivers updates for application 150. An update package for application 150 includes, but is not limited to, a number of features. The number of features are provided in a feature list, according to one embodiment. The feature list is presented on the feature management UI 115. The feature list may be stored and maintained in a schema format such as XML. Each feature from the feature list includes a default feature setting. The default feature setting is set by the vendor. For example, the vendor may set the default feature setting value of a feature to "on" or "off". However, the vendor may also define that an administrator at customer side has rights to change the default feature setting. In one embodiment, the vendor defines features that are "switchable". The feature setting of a "switchable" feature may be changed by administrator 105 via feature management UI 115. Administrator 105 accesses feature management UI 115 through a web browser, according to one embodiment. Feature management UI 115 enables administrator 105 to select features and change the default feature setting of each of the selected features, according to one embodiment.

Administrator 105 may select a set of features (feature set 135) from the list of features. Feature set 135 includes features available for users of application 150. Feature set 135 may include one or more features from the list. In addition, administrator 105 may define feature settings for the features included in feature set 135. The feature settings of features from feature set 135 are defined in feature setting module 140. In one embodiment, administrator 105 may adjust the default feature setting of a feature that is delivered "switchable" with an application. The feature may originally be delivered with default feature setting "on", but administrator 105 may adjust the feature setting to "off". In one embodiment, the feature list further includes an individual label for each feature. The feature label provides description of the feature. The description includes functional details for the feature. For example, information such as "this is a pre-view" or "this feature will be deprecated in the next version" may be included in the feature label. Thus, administrator 105 is able predict the impact of a feature by comparing current system landscape with changes that will occur once the feature is switched "on".

In addition, administrator 105 may define one or more feature settings in feature setting module 140 that may be changed by users testing the features. In one embodiment, test user 110 further configures feature settings in feature setting module 140 through self-service UI 120. Self-service UI 120 enables test user 110 to adjust feature settings defined as "switchable" by administrator 105. To define a feature setting "switchable", administrator 105 delegates rights to test user 110 to adjust the feature setting. Administrator 105 grants permission to adjust feature setting to more than one test user, according to one embodiment. For example, administrator 105 may create a group of test users and map the group to the permission. However, administrator 105 may delegate permission not only to a group of randomly selected test users, but also to groups defined in an organizational structure of an organization. For example, to users in the financial department of the organization.

Feature set 135 and feature settings from feature setting module 140 are stored in feature database 155, according to one embodiment. Feature database 155 may be stored on a hardware system along with feature management UI 115, self-service UI 120, and application 150. One skilled in the art will recognize, however, that feature database 155 may also be stored on a remote device. Feature database 155 may be connected with feature management UI 115, self-service UI 120, and application 150 through a public network, such as the internet or a private network, such as the intranet of an organization. Feature database 155 may be of different type, including but not limited to, relational, transactional, hierarchical, multi-dimensional (e.g., OLAP), object oriented, and in-memory. Feature database 155 may also be implemented as a file in a version control system, according to one embodiment.

In one embodiment, test user 110 has access to application UI 125 of application 150. Application UI 125 enables test user 110 to test and evaluate feature setting 140. In one embodiment, application 150 reads from feature setting module 140 feature settings of features from feature set 135. Application UI 125 displays features from feature set 135 in accordance with the feature configuration in feature setting module 140. The feature set configuration is set by administrator 105 via feature management UI 115 and by the test user 110 via self-service UI 120.

Application 150 stores logs that include log data for settings of application 150 features, according to one embodiment. Application 150 writes the log data for feature setting module 140 in feature setting log 160. Log data for feature settings may be explored by administrator 105, for example, as part of a feature settings evaluation process. A test user 110 may evaluate the improvement in user experience based on the different feature settings. Further, feature settings may be evaluated by administrator 105 to determine feature settings that are preferred by test users such as test user 110. In one embodiment, administrator 105 explores feature setting log 160 via log mining module 165. Log mining module 165 reads log data from feature setting log 160. Log mining module 165 is triggered through a feature evaluation UI 130. Feature evaluation UI 130 enables administrator 105 to evaluate feature setting log 160 data for feature setting module 140 of application 150.

Figure 2:
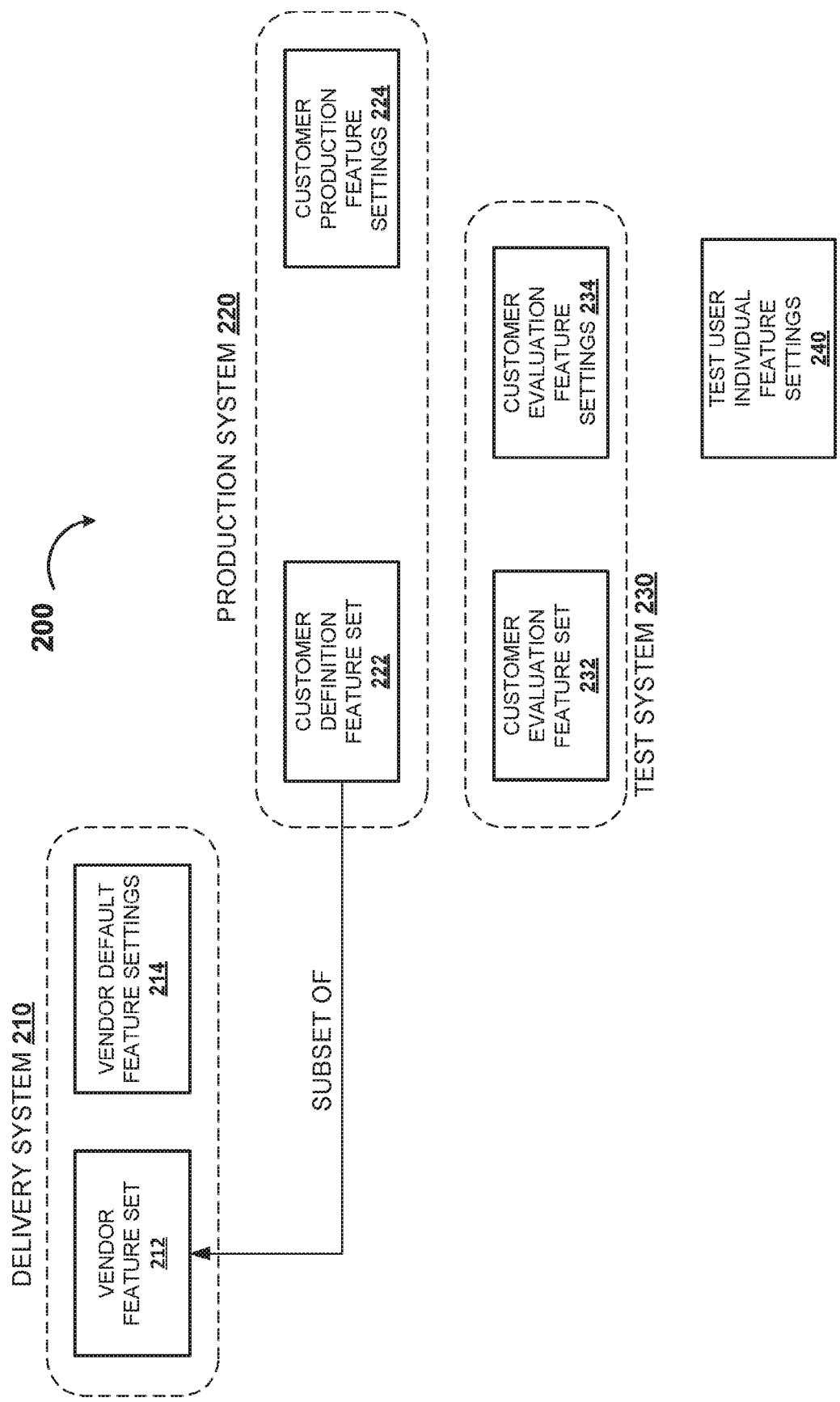
FIG. 2 is a block diagram illustrating an infrastructure for delivery of application feature sets, according to one embodiment.

FIG. 2 illustrates infrastructure 200 to deliver feature sets, according to one embodiment. Each software component/application version shipped by an application vendor specifies a number of features that may be controlled. In addition, each version contains new features, changed features, disruptive processes and potentially deprecated functions. The application version may also switch mandatorily on and off optional features functionality of a previous version/release. Moreover, a feature from the number of features may include a context information label. The context information label includes information for a planned state of the feature in the next software version. For example, the context information label may inform a customer administrator that the feature will be deprecated in the next version of the software.

Vendor feature set 212 is specified by the application vendor and contains all features for the application version. Further, the application vendor provides vendor default feature settings 214 that include a default feature setting for each of the features. The specified number of features is a list of functions that may be switched "on" and "off", according to one embodiment. The default setting for each feature is either "on" or "off".

Infrastructure 200 includes at least a delivery system 210, a production system 220, and a test system 230. Feature and feature settings are initially defined by the vendor and then transported to test system 230, for validation, and to production system 220. In one embodiment, vendor feature set 212 and corresponding vendor default feature settings 214 are defined in delivery system 210 at vendor side. Delivery system 210 provides vendor feature set 212 and vendor default feature settings 214 to test system 230 for validation.

A customer administrator defines the setting of sets of features for production. The customer administrator defines customer definition feature set 222 and corresponding customer production feature settings 224. The sets of feature settings are defined and validated in a development and test system environment. Customer evaluation feature set 232 represents a reference to customer definition feature set 222, according to one embodiment. Customer evaluation feature set 232 includes the same features that are included in customer definition feature set 222. Similarly, customer evaluation feature settings 234 represent a reference to customer production feature settings 224. Both customer definition feature set 222 and customer production feature settings 224 are defined by the administrator and then transported to the test system 230 for evaluation. The evaluation includes test user evaluation and customer administrator's evaluation. The test user evaluates usability and efficiency of features based on how much the features improve and ease the work process. The customer administrator evaluates features by inspecting log data for the features and creating statistics for the percentage of test users that switch a feature from "on" to "off" and vice versa. Moreover, by inspecting the log data for the features, the customer administrator determines the impact of the feature over performance of the system when the feature is "on" and when the feature is "off". The customer administrator also defines a set of features that test users may set "on" and "off"

to evaluate features (test user individual feature settings 240). This is a subset of all available features that may be switched on or off, according to one embodiment.

In one embodiment, deployment of a new application version may be planned by the customer based on context information for features in the version that is currently deployed at customer side. Further, implementation process may be phased. That is, deployment of a new feature may be decoupled from implementation.

Additionally, feature switching may be performed to deactivate a feature. For example, a customer may customize the source code of a current software version. Therefore, an upgrade to a new version or even a small error correction update may not work as intended by the vendor of the application. Thus, described switching mechanism may be also applied to error correction software bundles, in addition to major version updates. With a correction bundle of switchable corrections, the deployment process is eased. Corrections may be switched on, then a test may be run and in case the test fails, the correction may be switched off again. The customer code may be adjusted to the new version and a re-test may be run with the remaining corrections switched "on". This increases the acceptance of correction bundles at customer side.

Described switching mechanism also enables shipping of all new development, but switching desired features only, according to one embodiment. Thus, switching off features in production system is easy, because it is not necessary to create a new deployment of the software in order to remove an unwanted feature.

Figure 3:
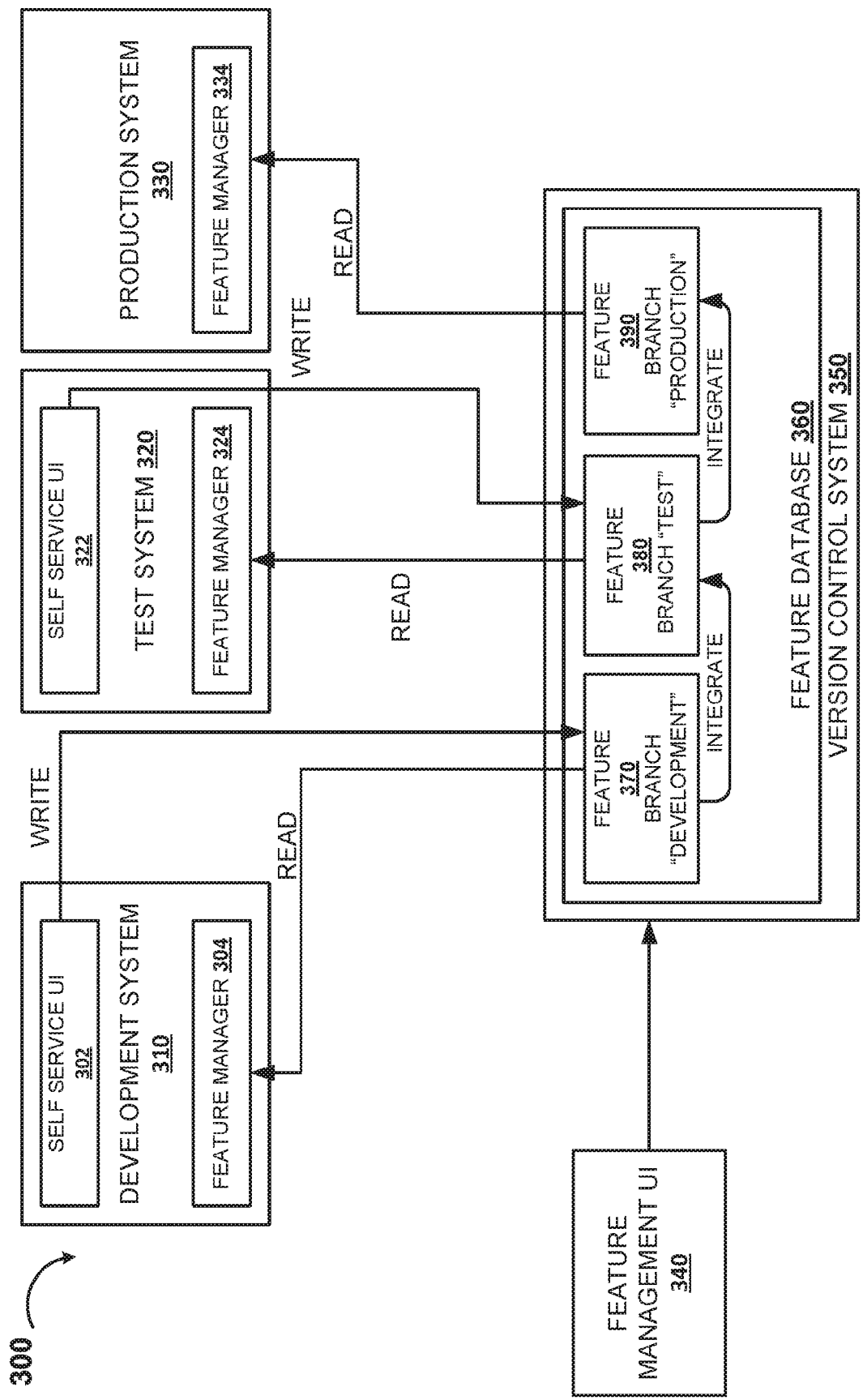
FIG. 3 is a block diagram illustrating management and transport of feature settings, according to one embodiment.

FIG. 3 illustrates infrastructure 300 to manage and transport features and feature settings, according to one embodiment. Feature database 360 stores a feature set and feature settings that are defined via feature management UI 340. In one embodiment, feature database 360 is implemented in a version control system 350. The feature set includes one or more features of an application. The one or more features are selected from a number of features of the application. An application vendor provides a list with the number of application features, according to one embodiment. The feature set is a subset from the list of features. The list of features includes a default setting for each feature. The default setting is specified by the application vendor. An application feature represents an application function that may be switched "on" and "off" such as personalized user access to resources, management and access to unstructured information (e.g., text files, slide shows, audio files), add or remove UI controls, including UI controls that provide shortcuts to additional functions. Features may span across different software components. Different software components may define one feature, according to one embodiment.

An application feature corresponds to a specific portion of the application source code that is delivered by the application vendor. Switching a feature "on" invokes the corresponding portion of the source code. Application features are initially defined and corresponding source code is created at the vendor side, according to one embodiment. For example, at development system 310. Development system 310 is connected to feature branch "development" 370 of feature database 360. Feature branch "development" 370 is part of version control system 350. Feature branch "development" 370 is integrated with feature branch "test" 380. Thus, feature branch "development" 370 and feature branch "test" 380 may exchange data. For example, the portions of source code that correspond to application features may be delivered from development system 310 to test system 320. When the application vendor delivers new version of the application, source code portions that correspond to all features of the application are delivered. The default feature setting determines features of the application that are delivered "on" and features that are delivered "off".

Test system 320 is connected to feature branch "test" 380 of feature database 360, according to one embodiment. Test system 320 includes feature manager 324 and self-service UI 322. Feature manager 324 reads feature set and feature settings from feature branch "test" 380 of version control system 350. The feature set and feature settings are presented to a user of test system 320 through self-service UI 322. Further to present the feature set and settings, self-service UI 322 enables the user of test system 320 to adjust the feature settings of features included in the feature set, according to one embodiment. Depending on permissions set in the feature management UI 340, the user of test system 320 is authorized to change feature settings of one or more features. For example, it may be defined in feature management UI 340 that the feature set includes ten (10) features. The feature settings are also defined in the feature management UI 340. For example, regardless of the default feature setting, all ten features are set "on". Additionally, five (5) of the features are further configured as "switchable" through the feature management UI 340. Thus, each user of test system 320 may individually change feature settings of the five "switchable" features. Enabling users to individually change feature settings significantly accelerates feature evaluation process. By switching a feature "off" and "on", a user of test system 320 may compare feature settings quickly and without any additional configurations in another system. One or more users of test system 320 may adjust feature settings in parallel and evaluate features individually. Development system 310 is open for customer developers, which may create source code, persistency and UI and extend or modify existing source code, persistency and UI. Customer developers may also create switches. Development system 310 is also used by configuration developers, creating a custom configuration from a vendor default, copying, modifying and adding configuration (e.g. organizational structure of the customer company, company subsidiaries, addresses, etc.). Self-service UI 302 and self-service UI 322 allow a test user in development system 310 or test system 320, respectively, to test the software process with different settings of the feature switches. The test user may switch a certain feature on, run the test, provide feedback, switch the feature off, test the feature and provide feedback again. Thus, the testing process is eased and single test users may test in one system various sets of configurations. Feature management is performed in version control system 350. The self-service UI writes the feature settings to a branch in the central management infrastructure, according to one embodiment. For example, self-service UI 302 in test system 310, writes to feature branch "development" 370 in feature database 360. The runtime in development system 310 reads the configuration from version control system 350 through feature manager 304 from feature branch "development" 370. Thus, feature settings are available centrally in feature database 360 for change management and transport from development system 310 to test system 320 and production system 330.

In one embodiment, a set of evaluated features is transported from the test system 320 to production system 330. Feature branch "test" 380 (that contains the settings in test system 320) is integrated with feature branch "production" 390 (that is read via feature manger 334 in production system 330) to enable transportation of an evaluated feature set from test system 320 to production system 330. Thus, the evaluated feature set, including corresponding feature settings, is transported to production system 330. Feature manager 334 reads the feature setting configuration from feature branch "production" 390, according to one embodiment. Transportation of the evaluated feature set eliminates the need of recreating the feature setting configuration from the test system 320 manually to the production system 330. Although transportation of the evaluated feature configuration is performed via integration of different branches of the same version control system 350, various embodiments may include the above described transportation of feature settings performed via a number of transport and change management mechanisms. For example, a configuration may be exported at test system 320 (e.g. from the settings stored in feature manager 304, when self-service UI 302 writes directly to feature manager 304) into a file, transferred to production system 330, and imported at the production system 330 (feature manager 334 reading the transported file).

Figure 4:
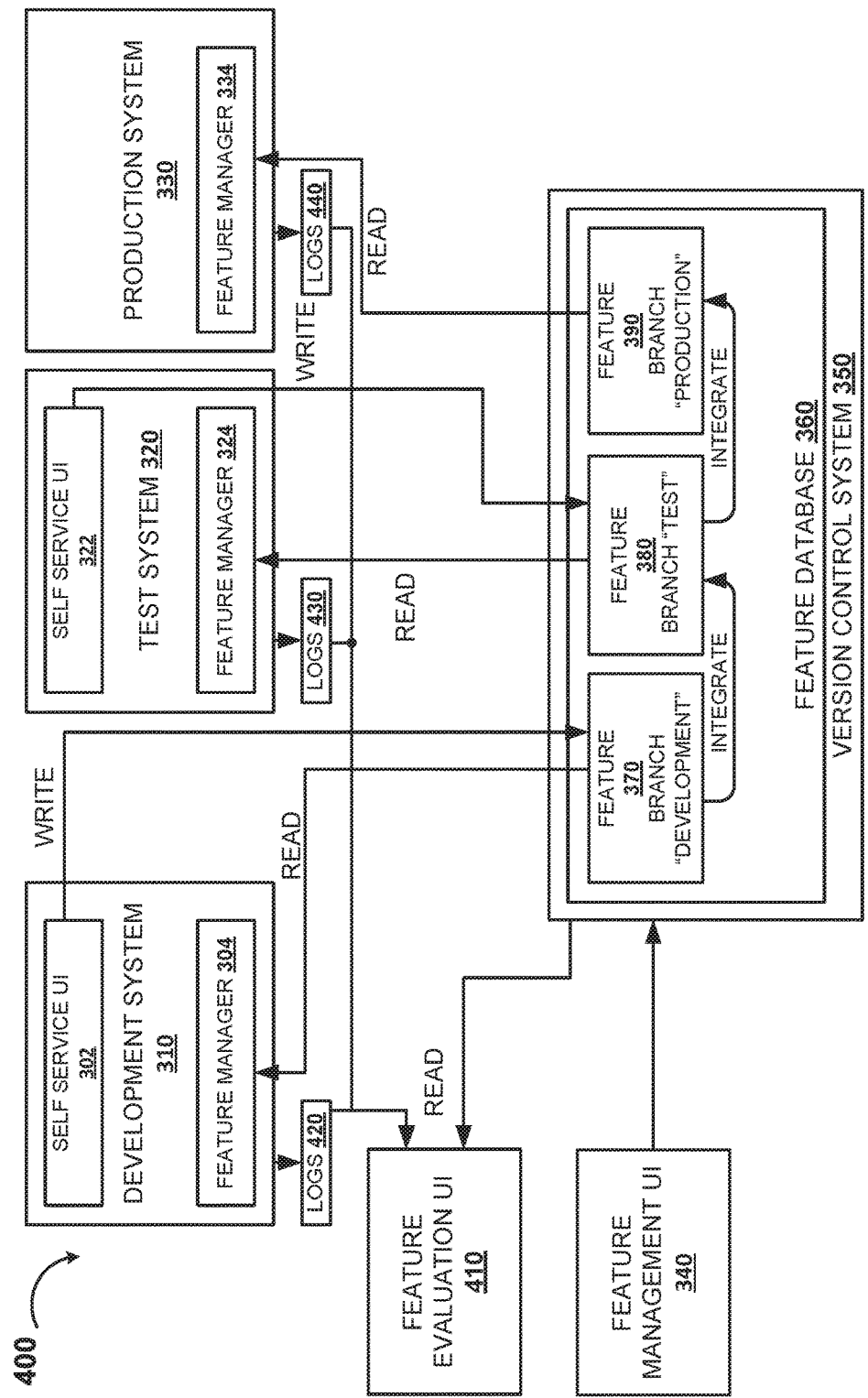
FIG. 4 is a block diagram illustrating management and transport of feature settings including feature evaluation, according to one embodiment.

FIG. 4 is a block diagram illustrating infrastructure 400 to manage, transport, and evaluate features, according to one embodiment. Infrastructure 400 includes similar elements as infrastructure 300. Further to the elements of infrastructure 300, infrastructure 400 includes feature evaluation UI 410. With reference to FIG. 3, features are evaluated by test users in test system 320. In addition, feature evaluation UI 410 enables an administrator to evaluate features and feature settings.

In one embodiment, feature evaluation UI 410 presents log data for features and feature settings to the administrator. Thus, feature setting analysis is performed. Log data is collected from development system 310, test system 320, production system 330, and version control system 350 and aggregated at feature evaluation UI 410. The log data includes information for the feature switch settings. For example, a specific user that runs the evaluation process in test system 320 and a set of features defined for the user may be read at logs 430.

Log 430 stores log data collected from test system 320, according to one embodiment. Similarly, logs 420 store log data collected at development system 310, and logs 440 store log data collected from production system 330. Logs include data for constrained feature settings. Constrained feature settings data include information for at least the setting of the feature, the user that adjusted the setting, and a timestamp of the adjustment. This may be used to run analysis on test system when feature switch is "on" compared to when it is "off". Further, when an issue is found and analyzed, data for the feature settings allow follow-up activities. For example, based on the analysis of log data, a problem with the feature may be discovered and the feature may be switched "off".

Feature metering is run in test and evaluation systems to support the decision process, if a certain feature shall be switched "on" or "off", but also for analyzing the production system in case of support incidents. Metering may also be combined with the change management of the features. Metering may be limited to the features changed in the last production change event.

Figure 5:
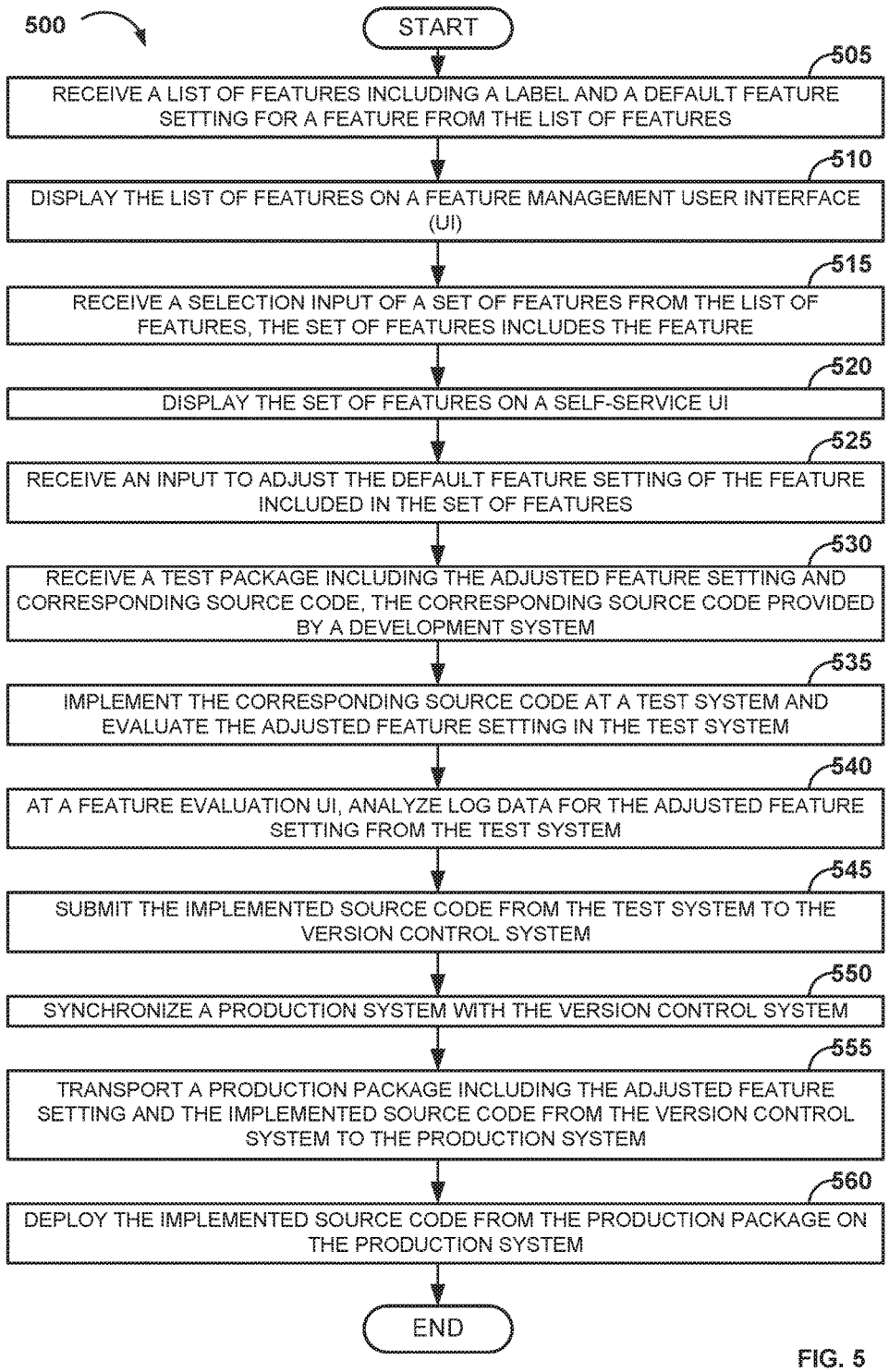
FIG. 5 is a flow diagram illustrating a process to transport a defined and evaluated feature to a production system, according to one embodiment.

FIG. 5 is a flow diagram illustrating a process 500 to transport a defined and evaluated feature of an application to a production system, according to one embodiment. An application vendor defines one or more features. At 505, a customer receives a list of predefined features. Each feature from the list of features includes a context label and a default feature setting. The application vendor configures the default feature setting during definition of the feature. The context label includes functional description of the feature. For example, a context label may describe expected impact over the customer system when the feature is switched "on". At 510, the feature list is displayed at a feature management UI. An administrator of the customer system accesses the feature management UI. A selection input is received from the administrator, at 515. The administrator selects a set of features from the list of features. The set of features includes the feature. The administrator may change the default feature setting of the feature. In one embodiment, the administrator may also give permission for further feature setting adjustment per individual user. At 520, the set of features are displayed on a self-service UI. The self-service UI enables the user to adjust the feature setting of the feature. In one embodiment, the feature setting of the feature matches the default feature setting delivered by the application vendor. At 525, an input to adjust/change the default feature setting is received.

The process to transport a defined and evaluated feature to the production system continues at 530, where a test package is received in a test system. The test package includes the adjusted default feature setting and a corresponding portion of source code, according to one embodiment. The portion of source code is provided by a development system. For example, portions of source code that are associated with corresponding features may be submitted from a development system to a version control system. The version control system may be connected to the development system and to the test system. Connection between the systems may be established through a public network (e.g., the Internet) or a private network (e.g., Intranet of an organization).

At 535, the portion of source code is implemented at a test system and evaluated by a test user. Additionally, the test system may collect log data including feature setting data. At 540, the administrator may further evaluate the feature setting and the corresponding source code portion by analyzing the collected log data in a feature evaluation UT. The feature evaluation UI may aggregate log data for feature settings from other system in addition to log data from the test system, according to one embodiment. For example, the feature evaluation UI may be further configured to aggregate log data from the development system and the version control system.

Upon evaluation, the adjusted feature setting and the corresponding source code portion is submitted, at 545, from the test system to the version control system. At 550, a production system synchronizes current feature settings with the version control system. At 555, a production package is transported from the version control system to the production system. The production package includes the feature setting and the implemented portion of source code, according to one embodiment. Then, at 560, the implemented portion of source code is deployed on the production system.

Described is a system and method for feature delivery and feature switching for on-premise/private cloud application components. A list of features is delivered to a customer by an application vendor. The list of features includes features of a specific application version. Each feature from the list of features is delivered with a corresponding default feature setting. The default feature setting may represent a feature setting recommendation. For example, a feature may be delivered with default feature setting "on" or "off". The default feature setting may be changed by an administrator at the customer side. Further, a feature may be delivered with no vendor recommendation. For example, the feature may have default feature setting "switchable". However, the default feature setting may also be mandatory, meaning that the default feature setting may not be changed. For example, a default feature setting may be set on "always on" or "always off". In such a case the application vendor configures the feature setting and does not allow any rights for changes to the customer.

By introducing several feature setting options, the application vendor provides a number of feature setting options to the customer, according to one embodiment. A customer administrator is provided with flexibility to configure the feature setting for each feature from the feature list that is delivered "on", "off" or "switchable". In one embodiment, the customer administrator may delegate rights to test user to decide which feature setting to activate. The customer administrator may also restrict user decision to a subset of the features from the list. For the rest of the features, the customer administrator may decide on behalf of the users.

In one embodiment, feature switches may define a lifecycle of a feature across several application versions. For example, a feature may be delivered "always off" in an application version, for example if the feature is still experimental. The feature may be switched to "off" by vendor recommendation in the next application version thus allowing each customer to decide whether to switch the feature "on". When it is evaluated that more users select to switch the feature "on" instead of "off", the vendor may deliver the feature with feature setting "switchable" in the next application version, and "on" by vendor recommendation in further application version. Upon establishing the feature among customers, a latest application version may deliver the feature "always on". Similarly, when an old feature is replaced by a new feature, the new feature lifecycle is started. After several application versions, the new feature may be set to "always on". Since the new feature replaces the old feature, feature setting of the old feature may be switched to "always off" in the next application version, thus completing the lifecycle of the old feature.

A set of features from the list of features is defined in a feature management UI. A feature setting is defined for each feature from the set of features. The set of features is presented to a test user in a self-service UI. Feature settings are adjusted by a test user via the self-service UI. A source code portion that corresponds to each adjusted feature setting is received and implemented at a test system. The source code portion is evaluated by a test user in the test system and by the administrator via a feature evaluation UI. The feature evaluation UI aggregates log data for the adjusted feature setting from the test system. The implemented source code portion that corresponds to the adjusted feature setting is transported from the test system to a production system and deployed.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems may be configured in a server-client, peer-to-peer, or some other configuration. The clients may vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
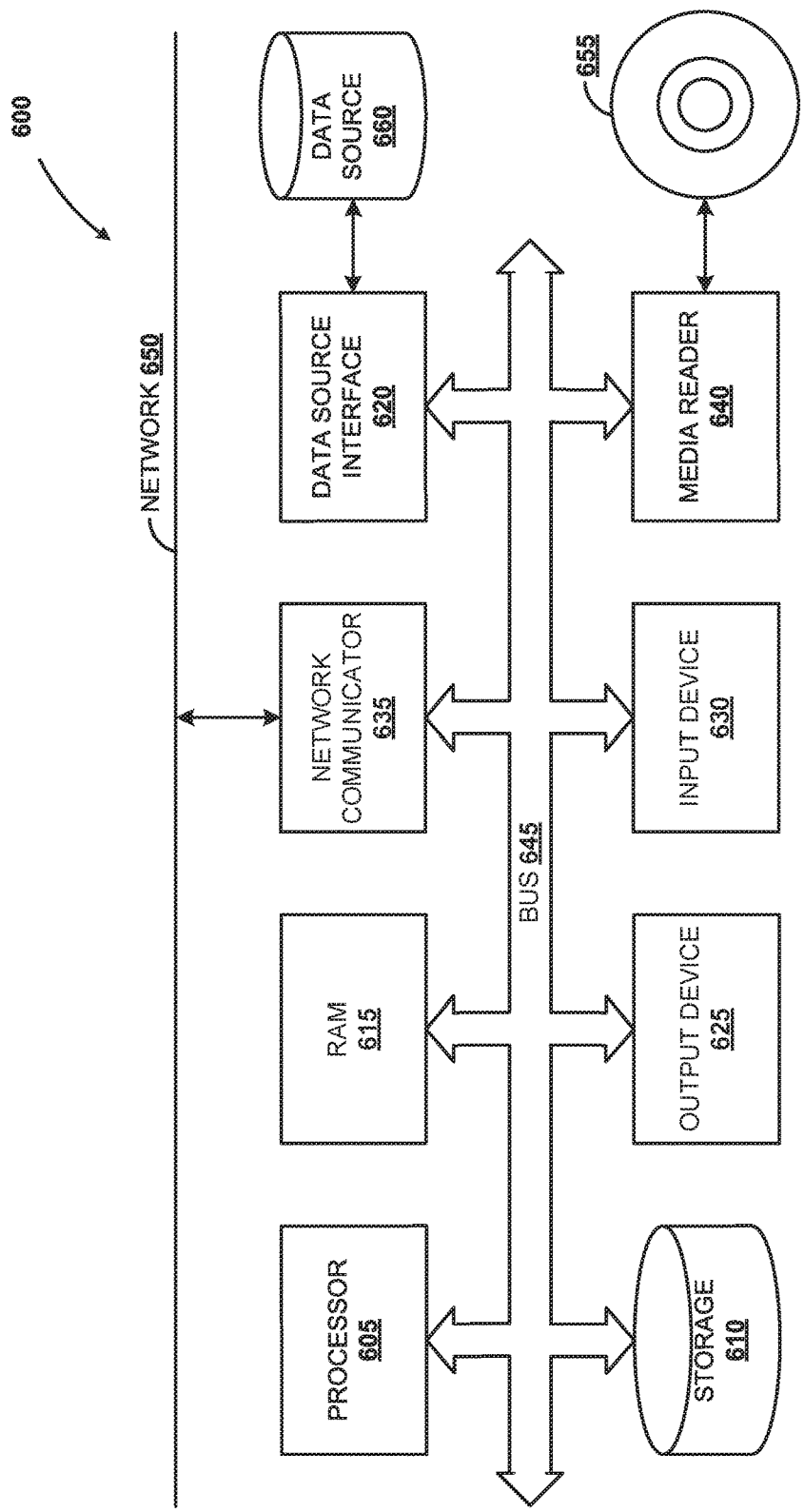
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAF), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. in addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to manage features of an application, the method comprising:
receiving a set of features, wherein a feature from the set of features comprises a feature setting;
adjusting the feature setting based on a user input, wherein a source code portion that corresponds to the adjusted feature setting is transported to a test system,
implementing the source code portion at the test system to enable evaluation of the adjusted feature setting at runtime;
submitting the source code portion from the test system to a production system to decouple deployment of the source code portion from implementation of the source code portion including:
submitting the evaluated feature from the test system to a version control system,
integrating the evaluated feature in the production system, and
synchronizing the production system with the version control system including reading the adjusted feature setting from the version control system through a feature manager of the production system, wherein the feature manager is connected with the version control system, and transporting a production package from the version control system to the production system wherein the production package comprises the adjusted feature setting of the evaluated feature and the source code portion; and
deploying the source code portion at the production system in accordance with the adjusted feature setting.

2. The computer implemented method of claim 1 further comprising:
receiving a test package comprising the adjusted feature setting and the source code portion, wherein the source code portion is submitted to the test system by a development system.

3. The computer implemented method of aim 1 further comprising:
displaying the set of features on a self-service UI.

4. The computer implemented method of claim 1, wherein the set of features is selected from a plurality of features of the application in a feature management UI.

5. The computer implemented method of claim 1, wherein the feature setting of the feature is initially defined in a feature management UI.

6. A computer system to manage features of an on-premise application, the computer system comprising:
at least one processor and memory for executing program code, the program code comprising:
a feature management user interface (UI) that enables definition of a set of features and definition of a feature setting for a feature from the set of features;
a self-service UI that enables adjustment of the feature setting, wherein the feature setting of the feature is defined as switchable in the feature management UI;
a test system that receives a source code portion corresponding to an adjusted feature setting, implements the source code portion to enable evaluation of the adjusted feature setting at runtime, submits the source code portion to decouple deployment of the source code portion from implementation of the source code portion, submits the evaluated feature setting to a version control system, integrates the evaluated feature setting in a production system, and synchronizes the production system with the version control system;
the version control system transports a production package to the production system, the production package comprising the adjusted feature setting of the evaluated feature and the source code portion;

a feature evaluation UI that enables analysis of log data for the feature from the test system; and the production system that receives and deploys the source code portion in accordance with the adjusted feature setting from the test system.

7. The computer system of claim 6, wherein the test system evaluates the adjusted feature setting in parallel with one or more feature settings of one or more features from the set of features.

8. The computer system of claim 7, wherein the test system receives the source code portion in a test package comprising the adjusted feature setting and a functional description of the adjusted feature setting.

9. The computer system of claim 7, wherein the feature evaluation UI aggregates the log data for the feature from a development system, the test system, and the production system.

10. The computer system of claim 7 further comprising:

the version control system coupled to a development system, the test system, and the production system, wherein the version control system receives the source code portion from the development system and transports the source code portion to the test system.

11. A non-transitory computer readable medium storing instructions, which when executed by at least one processor cause a computer to perform operations comprising:

receive a set of features of an on-premise application, wherein a feature from the set of features comprises a feature setting;

adjust the feature setting based on a user input, wherein a source code portion that corresponds to the adjusted feature setting is transported to a test system;

implement the source code portion at the test system to enable evaluation of the adjusted feature setting at runtime;

submit the source code portion from the test system to a production system to decouple deployment of the source code portion from implementation of the source code portion, submit the evaluated feature from the test system to a version control system, integrate the evaluated feature in the production system, and synchronize the production system with the version control system wherein the synchronize includes read the adjusted feature setting from the version control system through a feature manager of the production system, wherein the feature manager is connected with the version control system, and transport a production package from the version control system to the production system, wherein the production package comprises the adjusted feature setting of the evaluated feature and the source code portion; and deploy the source code portion at the production system in accordance with the adjusted feature setting.

12. The computer readable medium of claim 11, where the operations further comprising:

receive a test package comprising the adjusted feature setting and the source code portion, wherein the source code portion is submitted to the test system by a development system.

13. The computer readable medium of claim 11, wherein the operations further comprising:

display the set of features on a self-service UI.

14. The computer readable medium of claim 11, wherein the set of features is selected from a plurality of features of the on-premise application in a feature management UI.

* * * * *